W. C. FISH.
ELECTRIC HEATER.
APPLICATION FILED JAN. 13, 1906.

919,843.

Patented Apr. 27, 1909.
2 SHEETS—SHEET 1.

Witnesses:
George W. Tilden.
Hulen Alford.

Inventor:
Walter C. Fish,
by Albert G. Davis
Att'y.

W. C. FISH.
ELECTRIC HEATER.
APPLICATION FILED JAN. 13, 1906.

919,843.

Patented Apr. 27, 1909.
2 SHEETS—SHEET 2.

Witnesses:

Inventor:
Walter C. Fish,
by Att'y.

UNITED STATES PATENT OFFICE.

WALTER C. FISH, OF LYNN, MASSACHUSETTS, ASSIGNOR TO GENERAL ELECTRIC COMPANY, A CORPORATION OF NEW YORK.

ELECTRIC HEATER.

No. 919,843.

Specification of Letters Patent.

Patented April 27, 1909.

Application filed January 13, 1906. Serial No. 295,848.

*To all whom it may concern:*

Be it known that I, WALTER C. FISH, a citizen of the United States, residing at Lynn, in the county of Essex and State of Massachusetts, have invented certain new and useful Improvements in Electric Heaters, of which the following is a specification.

This invention relates to electric heating devices and has for its object the provision of a device of this character which will be inexpensive and efficient in operation, simple and convenient of construction and at the same time, thoroughly reliable, safe and durable.

My invention relates more specifically to electric heating devices to be used in cooking. In the culinary art as is well known, a variety of utensils is necessary. These, in the case of cooking with a stove can be made up in a very inexpensive way, but in the case of electric heaters, it has been the practice to equip each utensil with a heating means. This renders the devices expensive. Moreover, the heating attachment renders them difficult to clean.

The object of my invention, therefore, is to provide a heating base which is adapted to receive various utensils. In this case the utensils themselves may be of the ordinary type and equipped with an outer surface adapted to fit into the heating base.

In carrying out my invention, I provide an annular base having a tapering inner surface and having a heating coil wound around its outer surface for heating the same. The utensils are then made so as to have a correspondingly tapered outer surface and fit into close conductive relation with the base.

Figure 1:
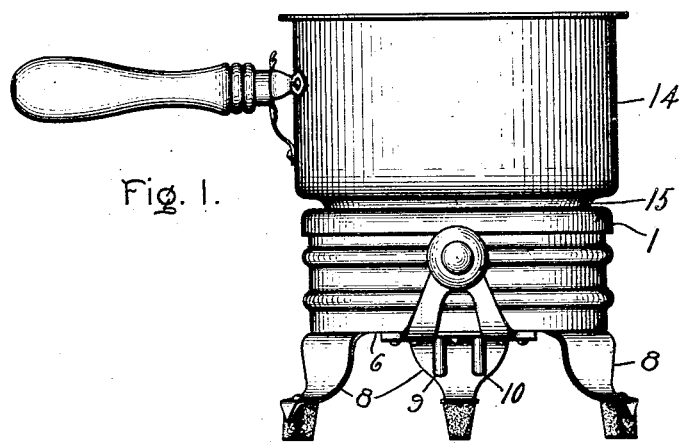
Figure 2:
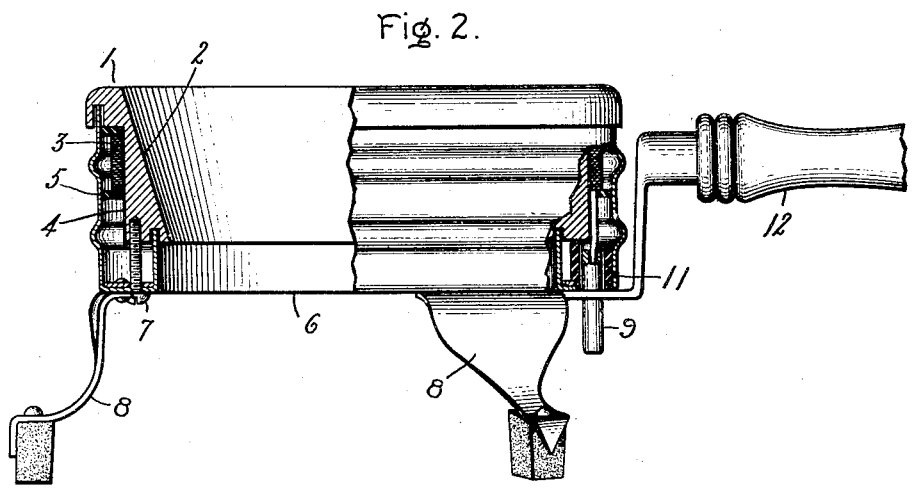
Figure 3:
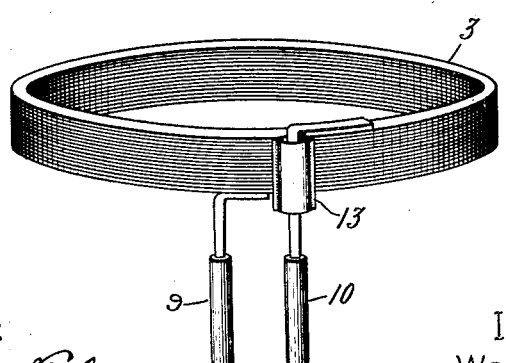
Figure 4:
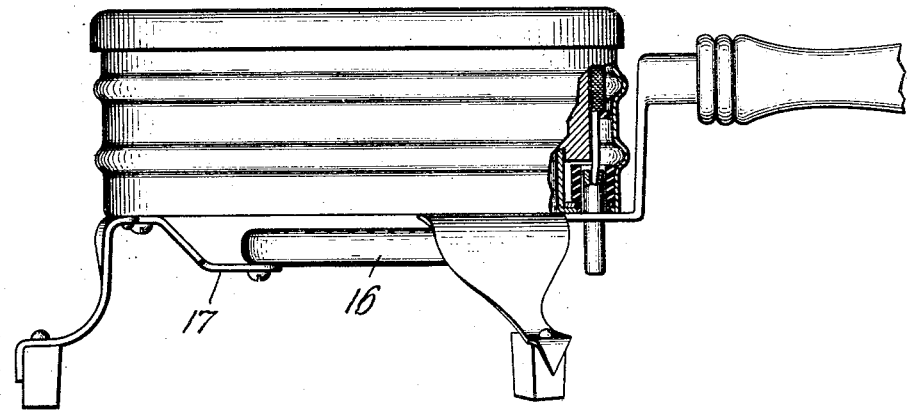

In the drawing which illustrates one embodiment of my invention, Figure 1 represents an elevation of my cooking device; Fig. 2 is an elevation of the base thereof, partly in section; Fig. 3 is a detail view showing the heating coil; Fig. 4 is an elevation, partly in section, of a modified form of my invention; and Fig. 5 is a bottom plan view of the same.

Referring to the drawing, 1 represents the base of my cooking device which is in the form of a ring and may be of any suitable material, such as cast iron. This ring is made so as to have a tapering inner surface as at 2, the taper being preferably slight, although it may of course be varied to suit conditions. Surrounding the ring 2 is a heating coil 3, preferably of edgewise wound resistance conductor, separated from the ring by an insulating layer of mica 4, rings of insulating material 5 binding the coils together and further insulating the same. A casing 6 is supported on ring 2 and insulating rings 5, and is secured to the former by means of a screw 7. Legs 8, preferably three in number, are secured to the casing to support the ring in a horizontal position. The terminals 9 and 10 of coil 3 are brought down through insulating bushings 11 so as to project below the casing at a point adjacent the handle 12. A protecting sleeve 13 of mica insulates the terminal 10 from the turns of the coil, which may be edgewise, or any desired type. A cooking utensil 14 having the lower portion 15 tapered to correspond with that of the taper 2 is adapted to fit into the ring. This taper causes a wedging action and results in an intimate thermal relation between the ring and the utensil, and also provides for a variation in the size of the tapered portion of the utensil.

Figure 5:
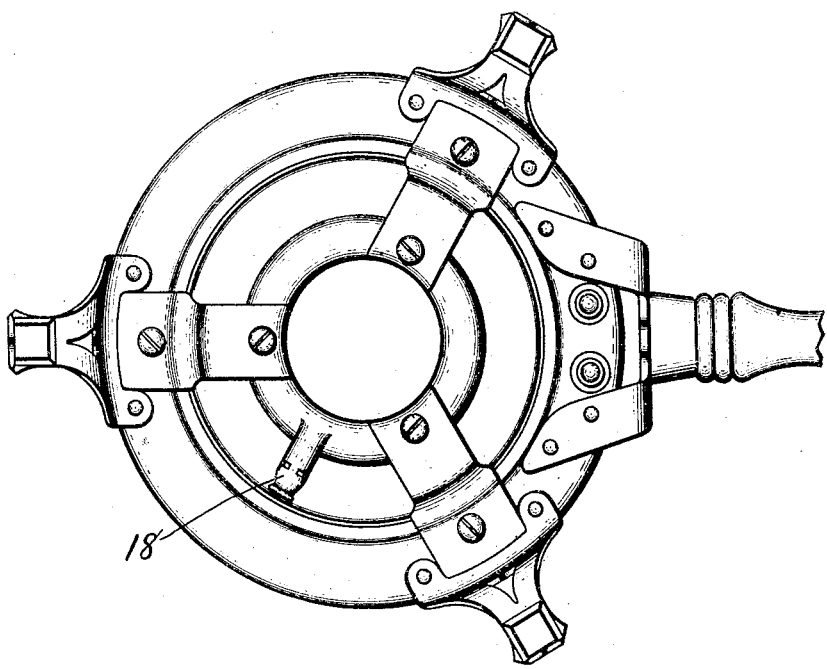

In Figs. 4 and 5 I have shown a modified form of my invention, in which arrangement I have shown, in addition to the electric heating equipment, a gas burner 16, attached to the base by means of supporting bracket 17, or in any desired manner. This burner may be of any desired type, but the ordinary ring burner is well adapted to this construction, connection being made to a flexible gas pipe through the nipple 18. The arrangement is such that the device may be heated either by the gas or by the electric heat, or by both, if desired. A device of this character would be convenient in cases where both gas and electricity are available for use as heating means and where by accident or from other reasons one or the other is rendered temporarily inoperative. Such a device would also prove a great convenience in cases where the users might change their place of residence, since one residence might be equipped with gas and the other with electricity. Furthermore, in certain cases a greater amount of heat might be desired than could be obtained through either form of heater separately, and in such cases the two might be combined in a very efficient manner.

It will thus be seen that I have provided a cooking utensil in which a single heating base acts as an ordinary stove and is adapted to heat a variety of types of utensils. The base may be manufactured entirely independent of the utensil, which may be of any desired material and can thus be kept clean and will be more durable than the devices heretofore made having the heating coils attached thereto. While I have shown and described a particular embodiment of my invention, including a particular form of the heating means, namely, an edgewise coil, it should be understood that I do not limit my invention in this particular, nor as to the particular shape or arrangement of my device, except as it is limited by the scope of the claims annexed to and forming a part of this application.

What I claim as new and desire to secure by Letters Patent of the United States, is,—

1. An electric cooking device comprising an annular base having a smooth tapering surface and supported in an elevated position, means for heating the same, and a receptacle adapted to fit into intimate thermal relation with said base.

2. An electric cooking device comprising an annular base having a smooth tapering inner surface and supported in an elevated position, electrical means for heating the same, and a receptacle adapted to fit into intimate thermal relation with said base.

3. An electric cooking device comprising an annular base having a tapering inner surface and supported in an elevated position, an electric resistance in heat conductive relation therewith, and a receptacle having a correspondingly tapered outer surface and adapted to fit into intimate thermal relation with said ring.

4. An electric cooking device comprising a ring-shape heating base having a tapering inner surface, a resistance conductor wound on the outer surface thereof, means for supporting said ring in an elevated position, and a receptacle having a similarly tapered outer portion adapted to fit into intimate thermal relation with said ring.

5. An electric heater comprising a metallic ring having a smooth tapering inner surface, an electric resistance in heat conductive relation therewith, a support for said ring whereby it is maintained in an elevated position and a supplementary heating device permanently secured to said ring mounted so as to heat the interior thereof.

6. An electric cooking device comprising an annular base having a tapering inner surface and supported in an elevated position, an electric resistance in heat conductive relation therewith, a receptacle having a correspondingly tapered outer surface adapted to fit into the ring and a gas burner permanently mounted upon the lower portion of said ring and arranged to heat the interior thereof.

In witness whereof I have hereunto set my hand this tenth day of January, 1906.

WALTER C. FISH.

Witnesses:
JOHN A. McMANUS, Jr.,
ROBERT SHAND.